Jan. 5, 1954  J. F. COURTNEY ET AL  2,664,671
RECEIVING MECHANISM FOR DRAWN GLASS STRANDS
Filed April 4, 1951
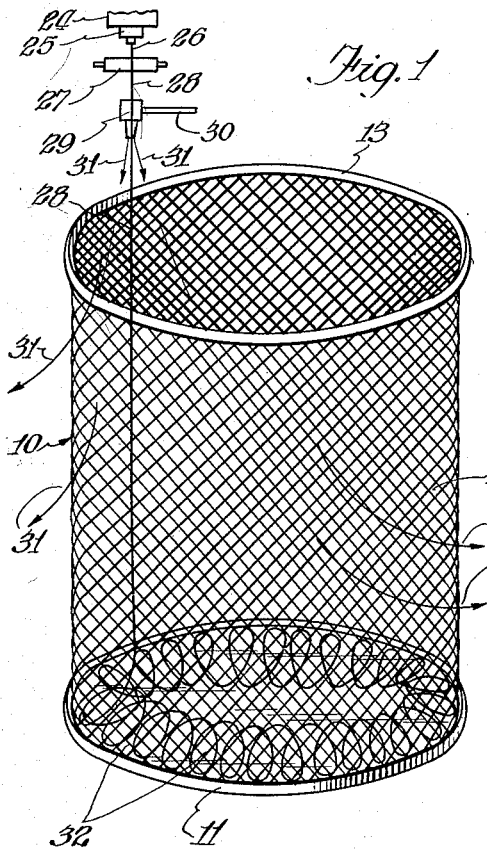
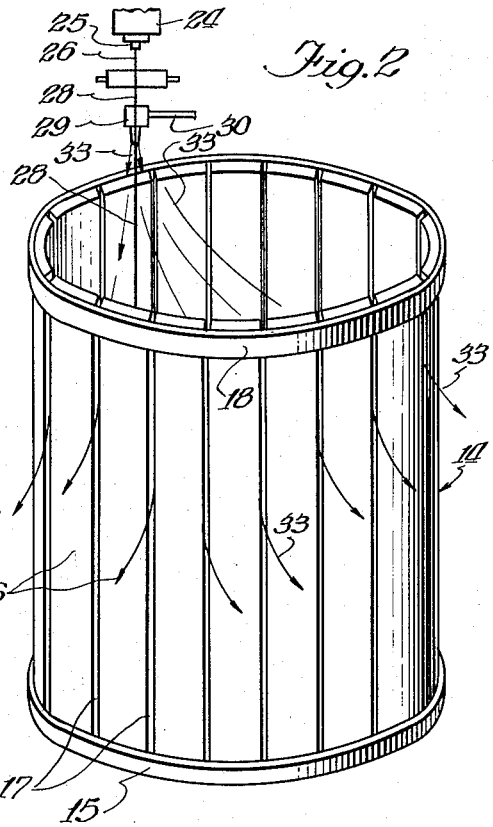
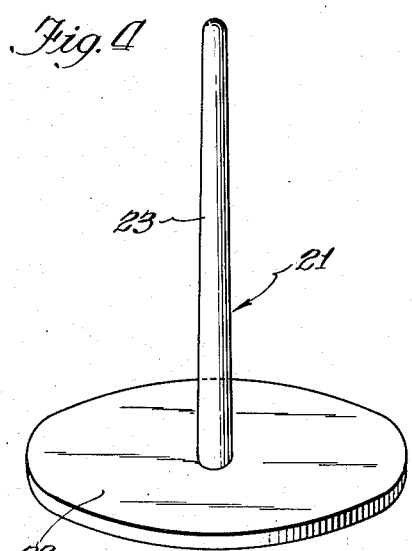
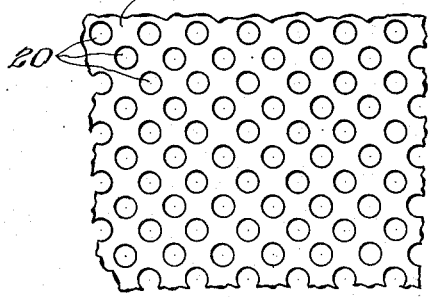
Inventors:
Joseph F. Courtney.
Adelbert C. Radtke
By: Paul O. Pippel
Attorney.

Patented Jan. 5, 1954

2,664,671

UNITED STATES PATENT OFFICE 2,664,671

RECEIVING MECHANISM FOR DRAWN GLASS STRANDS

Joseph F. Courtney, Chicago, and Adelbert Carl Radtke, Oak Park, Ill., assignors to International Harvester Company, a corporation of New Jersey Application April 4, 1951, Serial No. 219,255

2 Claims. (Cl. 49—17)

1

This invention relates to a new and improved receiving mechanism for a drawn glass strand.

The continuous drawing of a die formed glass strand more particularly a plastics coated glass strand has made obsolete all of the previously known packaging means for glass strands. Heretofore glass strands were wound on spools and when the spools became full it was necessary to cut the strand and commence a new spool. The strand capacity on a spool was very limited and the stresses and strains imposed on the spool wound strand were excessive. The application of plastics coated glass strand to spools resulted in an even more deplorable condition as the relatively tacky strand becomes a solid mass.

An important object of this invention is to thus provide a packaging means for continuously drawn and plastics coated glass strand.

Another important object of this invention is to supply a receiving mechanism for a drawn glass strand which is capable of holding a long unbroken strand and which is further adaptable for use in a series whereby when one receiving mechanism becomes full the glass strand may then be delivered without severing to a succeeding receiving mechanism.

A still further principal object of this invention is the provision of a receiving mechanism for drawn glass strand which permits escape of entrapped air normally attendant the drawing of glass strand.

Another and still further important object of this invention is to provide a receiving mechanism for drawn glass strand and particularly glass strand that has been given a plastics coating in which the strand does not fluff up or become matted in a cake form.

Another important object of this invention is to provide a perforated container for receiving a glass strand wherein the rush of air occasioned by the drawing of the glass strand will be dissipated through the perforations and the strand deposited in a regular pattern in the container without any tendency to tangle.

Another and further important object of this invention is the provision of a stake receiving device for drawn glass strand.

Other and further important objects will become apparent from the disclosures in the following specification and accompanying drawing.

In the drawing:

Fig. 1 is a perspective view of a wire mesh glass strand receiving container of this invention.

2

Fig. 2 is a perspective view of a modified form of container employing spaced staves.

Fig. 3 is an elevational detail view of a portion of a modified form of perforated wall for the containers of Fig. 1 or 2.

Fig. 4 is a perspective view of a stake receiving mechanism for drawn glass strand.

As shown in the drawing:

The reference numeral 10 indicates generally a wire mesh container as shown in Fig. 1. The container 10 includes a solid circular base 11 and a substantially cylindrical wall 12 extending upwardly from the base 11. The cylindrical wall 12 is made of wire mesh material. The container 10 further includes a rim 13 extending around the upper circumferential end.

As best shown in Fig. 2 a staved container 14 includes a solid circular base 15 with circumferentially spaced and substantially vertically disposed staves 16 forming a cylindrical wall. The staves 16 define vertical spaces 17 and thus the cylindrical wall of the staved container 14 is perforated as is the wire mesh cylindrical wall 12 of the container 10. A circular band 18 is provided around the top of the container 14 to hold the staves 16 in fixedly spaced apart position.

A perforated sheet material 19 shown in Fig. 3 is provided with a plurality of holes or apertures 20. This material is adapted to be used as a modification for the cylindrical walls of the containers 10 or 14. In all three modifications the cylindrical walls of the receiving containers are perforated to permit rapid escape of air and turbulence which is occasioned by the drawing and depositing of glass strand into a container of this type.

A further modification of this invention is shown in Fig. 4 wherein a receiving mechanism 21 is again provided with a solid base 22 and rather than a perforated cylindrical side wall has a stake 23 vertically positioned substantially centrally of the base 22.

In depositing glass strand into or on a package immediately after the formation of the strand upon passing through a die in the bottom of a glass furnace and immediately thereafter being provided with a quick curing plastics coating, there is ever present the necessity of dissipating the turbulent air currents created by the high drawing speeds. To attempt to deposit drawn and coated glass strand in a solid walled container results in an utter lack of control of the strand and a fluffing and a tangling of the strand making future use of the strand impossible. As shown somewhat diagrammatically in Figs. 1 and 2, a glass furnace 24 provided with a die or bushing 25 delivers a glass filament or strand 26. An applicator roll 27 is adapted to coat the strand 26 with plastics or the like materials. These plastics coatings generally require a short time to "cure" before they lose their tackiness and thus it is imperative that the coated strand designated by the numeral 28 be fully controlled. A strand drawing and discharging means such as the air nozzle 29 is adapted to pull the uncoated strand 26 from the furnace 24 over the plastics applicator roll 27 and thereafter pull and discharge the coated strand 28 downwardly under the force of a fast moving stream of air. Air under pressure is delivered through the conduit 30 and directed around the circumference of the strand and thence downwardly with the strand as indicated by the arrows 31. The coated glass strand 28 is delivered to the wire mesh container 10 at high speeds with great quantities of air entrapped therewith due to the rapid movement thereof as well as to the drawing air nozzle 29. The strand is preferably delivered at some point in the container spaced from the vertical axis or center line of the cylindrical containers. Upon rotating the container 10, the strand 24 is deposited for piling on the solid bottom of the container forming an overlapping circular pattern. The wire mesh wall of the container 10 permits rapid easy escape of the turbulent air currents accompanying the drawn strand as shown by the arrows 31 thus permitting the strand to lie in the smooth even pattern 32. In addition to the dissipation of the air occasioned by the drawing apparatus, the devices of this invention contemplate the displacement of atmospheric air present in and around the receiving means. Similarly, the staved container 14 will dissipate the air currents as shown by arrows 33 through the vertical spaces 17, and in the exent a container having the perforated sheet material 19 as a side wall, air currents may pass outwardly through the many holes 20. In all three containers the strand is permitted to fall within the turbulent and "winding" effect of the drawn glass strand delivered at relatively high speeds.

The stake receiving mechanism 21 of Fig. 4 similarly dispenses with undesirable air currents by eliminating the side walls altogether and merely providing a central stake about which the glass strand may be wound from the solid circular base 22 to the top of the stake.

It is believed that herein is provided a novel receiving mechanism for drawn glass strand which eliminates the undesirable turbulent effects of the air accompanying a drawn strand and provides for a smooth even packaging of the glass strand by constantly dissipating the air through perforated side walls or by the entire elimination of side walls and utilization of a central stake.

Various details of construction may be varied without departing from the principles disclosed herein, and we therefore do not propose limiting the patent granted hereon otherwise than as necessitated by the appended claims.

What is claimed is:

1. A coated glass strand drawing and receiving apparatus comprising in combination a strand nozzle, means feeding a blast of air to said nozzle, said nozzle performing the dual function of drawing a coated glass strand and discharging it under and with air pressure, a strand receiving container having a solid base, and a substantially cylindrical upstanding perforate wall carried by said solid base, said nozzle disposed above said container and delivering coated glass strand and air downwardly into said container, whereby the air acts to tamp the coated glass strand into said container with sufficient gentleness so the adjoining coatings are not welded together and the air is immediately discharged through the perforate wall to prevent interference with the laying of succeeding coated glass strand in said container.

2. A device as set forth in claim 1 in which the substantially cylindrical upstanding perforate wall is a wire mesh.

JOSEPH F. COURTNEY.
ADELBERT CARL RADTKE.

References Cited in the file of this patent
UNITED STATES PATENTS

| Number | Name | Date |
| --- | --- | --- |
| 954,451 | Merrell | Apr. 12, 1910 |
| 2,411,660 | Manning | Nov. 26, 1946 |